United States Patent [19]
Krofta

[11] Patent Number: 5,296,149
[45] Date of Patent: Mar. 22, 1994

[54] LAMELLAR APPARATUS AND METHOD FOR CLARIFYING WATER

[76] Inventor: Milos Krofta, 58 Yokun Ave., Lenox, Mass. 01240

[21] Appl. No.: 886,414

[22] Filed: May 20, 1992

Related U.S. Application Data

[63] Continuation-in-part of Ser. No. 755,697, Sep. 6, 1991, Pat. No. 5,188,729, which is a continuation of Ser. No. 241,384, Sep. 7, 1988, Pat. No. 4,931,175.

[51] Int. Cl.$^5$ .......................... C02F 1/24; B01D 21/02
[52] U.S. Cl. ..................................... 210/704; 210/802; 210/221.2; 210/519; 210/521; 210/523; 210/540
[58] Field of Search ...................... 210/221.2, 519, 520, 210/521, 523, 525, 528, 530, 538, 540, 703, 704, 705, 802

[56] References Cited

U.S. PATENT DOCUMENTS

| | | | |
|---|---|---|---|
| 1,020,013 | 3/1912 | Arbuckle | 210/521 |
| 2,874,842 | 4/1955 | Krofta | 210/540 |
| 3,067,878 | 7/1959 | Genter et al. | 210/521 |
| 3,182,799 | 5/1965 | Krofta | 210/117 |
| 3,452,869 | 1/1967 | O'Neill | 210/520 |
| 4,022,696 | 5/1977 | Krofta | 210/520 |
| 4,184,967 | 1/1980 | Krofta | 210/525 |
| 4,346,005 | 8/1982 | Zimmerman | 210/521 |
| 4,377,485 | 3/1983 | Krofta | 210/704 |
| 4,626,345 | 12/1986 | Krofta | 210/104 |
| 4,931,175 | 6/1990 | Krofta | 210/521 |

FOREIGN PATENT DOCUMENTS 1101262 7/1984 U.S.S.R. .

Primary Examiner—Christopher Upton
Attorney, Agent, or Firm—Dike, Bronstein, Roberts & Cushman

[57] ABSTRACT

A tank receives raw water for clarification by flotation. An array of lamellae define a set of generally vertically oriented channels with solid side walls. Flotation occurs in each channel. The channels are preferably inclined. With a round tank, a frame rotates an interlocking array of radial and concentric lamellae. A stationary raw water inlet distribution box fills the channels with raw treated water. An aligned clarified water collection box withdraws clarified water. A stationary skimmer directs floating sludge to a removal conduit with a variable pitch screw conveyor. Sliding seals on the lamellae isolate individual channels or groups of channels as they move through the tank. The channels lock and move columns of water through the tank with substantially no turbulence.

15 Claims, 5 Drawing Sheets

LAMELLAR APPARATUS AND METHOD FOR CLARIFYING WATER

REFERENCE TO RELATED APPLICATION

This application is a continuation in part of U.S. Patent Ser. No. 07/755,697 filed Sep. 6, 1991, now U.S. Pat. No. 5,188,729, which in turn is a continuation of U.S. Patent Ser. No. 07/241,384, filed Sep. 7, 1988, now U.S. Pat. No. 4,931,175.

BACKGROUND OF THE INVENTION

This invention relates in general to an apparatus and method for the clarification of water where the removal of suspended particles is accomplished by a flocculating agent and flotation using a stream of rising, microscopic air bubbles. More specifically, it relates to an improved clarification apparatus and method of the general type described in U.S. Pat. Nos. 4,022,696 and 4,931,175 using single stage flotation in a flotation tank.

Water clarification the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot (40 $1/m^2/min$). To handle large volumes of raw input water, sedimentation facilities must therefore be large, with attendant cost and space utilization disadvantages.

Flotation techniques dissolve a few percent of air by volume in pressurized water and then release the air in the form of microscopic bubbles which attach to the particles and carry them upwardly to the surface where they form a floating sludge. The particles are usually coagulated and flocculated using conventional agents such as alum and/or polymers before the air bubbles are introduced. Flotation techniques are theoretically capable of achieving clarification rates of 7.5 gallons per minute per square foot of flotation area (300 $1/m^2/min$) Heretofore in practice the rates have been less than this theoretical value, but significantly better than for sedimentation techniques.

Several early attempts by applicant to use flotation techniques to clarify water are described in U.S. Pat. No. 2,874,842 issued in 1959 and U.S. Pat. No. 3,182,799 issued in 1965. They use a stationary tank with no skimmers or other moving components in the tank. The gas bubbles were introduced via the main raw water inlet and guided within the tank by an internal deflector ('842) or a stack of internal baffles ('799). Because the gas bubbles were guided by stationary components, there was no design problem created by the turbulence of moving part in the flotation tank. Also these devices did not lend themselves to treatment at high flow rates. The '799 apparatus had the additional problems in that (i) the inlet water had to be separately fed from the side to the region between each adjacent pair of baffles and (ii) the flow paths for floated particles varies depending on the vertical position of the associated baffles defining the flow path. This latter situation means that the apparatus either does not fully treat the inlet water, or is slow.

Applicant holds several other U.S. patents for water clarification apparatus and processes, including U.S. Pat. Nos. 4,022,696; 4,377,485; 4,626,345; 4,184,967; and 4,931,175, which greatly improve over the performance of the early '842 and '799 devices. In the '696 clarifier, sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a carriage that rotates about the tank. The scoop is preferably of the type described in applicant's U.S. Pat. No. 4,184,967. The rate of rotation is set so that the floated particles will reach the surface of the water held in the tank in the time of one rotation. A good degree of clarification can be achieved with each rotation of the carriage using a comparatively shallow tank, e.g. 16–18 inches. This SPC unit clarifies at a rate of about 130 liters/$m^2$/min. This is much better than the rate using sedimentation techniques, but less than half of the theoretical maximum rate.

In the Supracell and the other clarifiers described in the aforementioned patents, there are common design features and limitations. For one, the flotation of the flocced particles is generally vertical, and is in a body of water that is comparatively shallow and generally free from turbulence. Also, in all of these designs the removal of the floated sludge is by a bladed, rotating scoop feeding an inclined discharge pipe. Also, heretofore, in order to increase the capacity of a given type of clarifier, one built a larger diameter tank. While in theory one can build a large enough tank to accommodate any clarification load, cost and space constraints have provided practical limitations on the capacities of these units.

It is therefore a principal object of this invention to provide an improved water clarification apparatus that can increase the clarification rate of known flotation-type clarifiers by a factor of at least two with no attendant increase in the size of the unit.

Another principal object is to provide the foregoing increase in productivity with a comparatively small increase in cost.

Yet another object is to provide an improved sludge removal apparatus.

Summary of the Invention

Clarification of raw water treated with a flocculating agent and dissolved air that is released to form microscopic bubbles occurs in a body of the water held in a tank. The tank has a generally flat bottom which may include apertures found in one sector of the bottom wall to withdraw clarified water from the tank and a sump to collect settled particulates.

A set of lightweight, plate-like lamellae substantially fill the tank. The lamellae are organized to define a set of generally vertically oriented channels. Each channel has generally solid side walls to lock a column of water within the channel during clarification. The tank is circular and the lamellae are a set of radially directed, vertically oriented plates that interlock with a set of generally concentric plates. The concentric plates are preferably inclined from the vertical and mutually spaced to provide longer flotation path than a straight vertical rise. All, or at least a portion of, the radial plates have sliding seals between themselves and the bottom wall. The seals lock a portion of the water in each channel to isolate the flotation clarification in each channel from turbulence produced by movement of the lamellae in the tank. They also wipe sedimented contaminants to a sump.

There is an arrangement for producing relative movement between the array of lamellae and the tank. A support structure includes a spider like frame that supports the array of channels between cylindrical inner and outer walls. The weight is carried by a central tubular support and on a set of wheels that ride on the bottom wall. A gear motor rotates the frame, and the lamellae carried on the frame, through the tank.

Raw water is introduced into the circular tank using a distribution box that extends radially across the tank. It is stationary and feeds treated aerated water to a sector of the tank over the channels. Another box lies under the channels to receive clarified water displaced by the introduction of raw treated water to the top of the channels. A conduit extends across the tank, also radially, just before the inlet box. It has a longitudinal slot open to the surface of the water and a skimmer that directs the floated sludge carried by the movement of the underlying channels into the conduit. A variable pitch screw conveyor mounted for rotation within the conduit directs collected sludge along the conduit to a sludge outlet.

The tank includes a sump in its bottom wall with a drain and automatic flush valve to remove settled particulates carried along by the lamellae and/or their wiper seals.

These and other features and objects of this invention will be more fully understood from the following detailed description which should be read in light of the accompanying drawings.

DETAILED DESCRIPTION OF THE PREFERRED EMBODIMENTS

Figure 1:
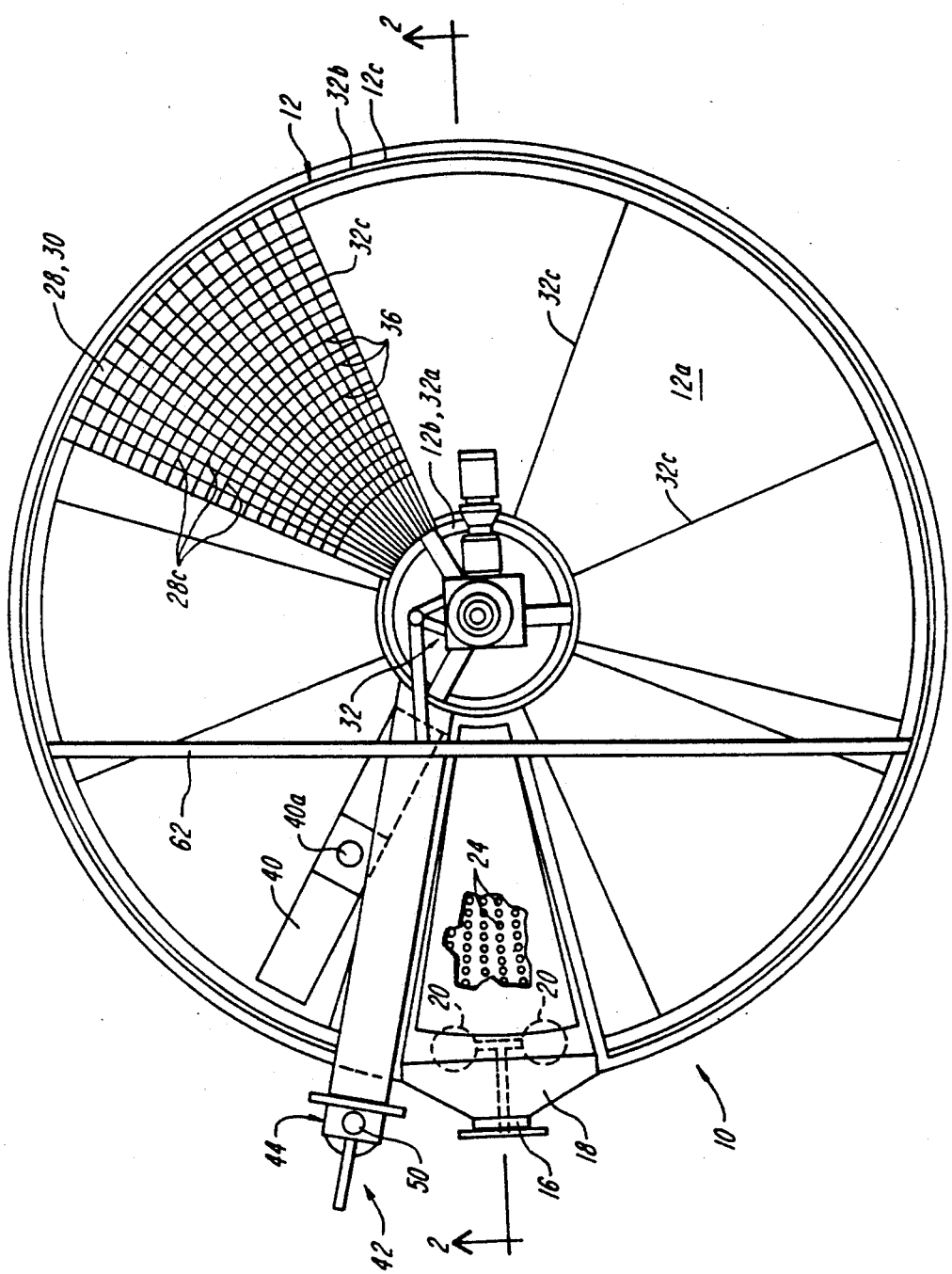
FIG. 1 is a top plan view of a circular tank lamellar clarifier according to the present invention but showing the lamellae in only one sector of the tank.
Figure 2:
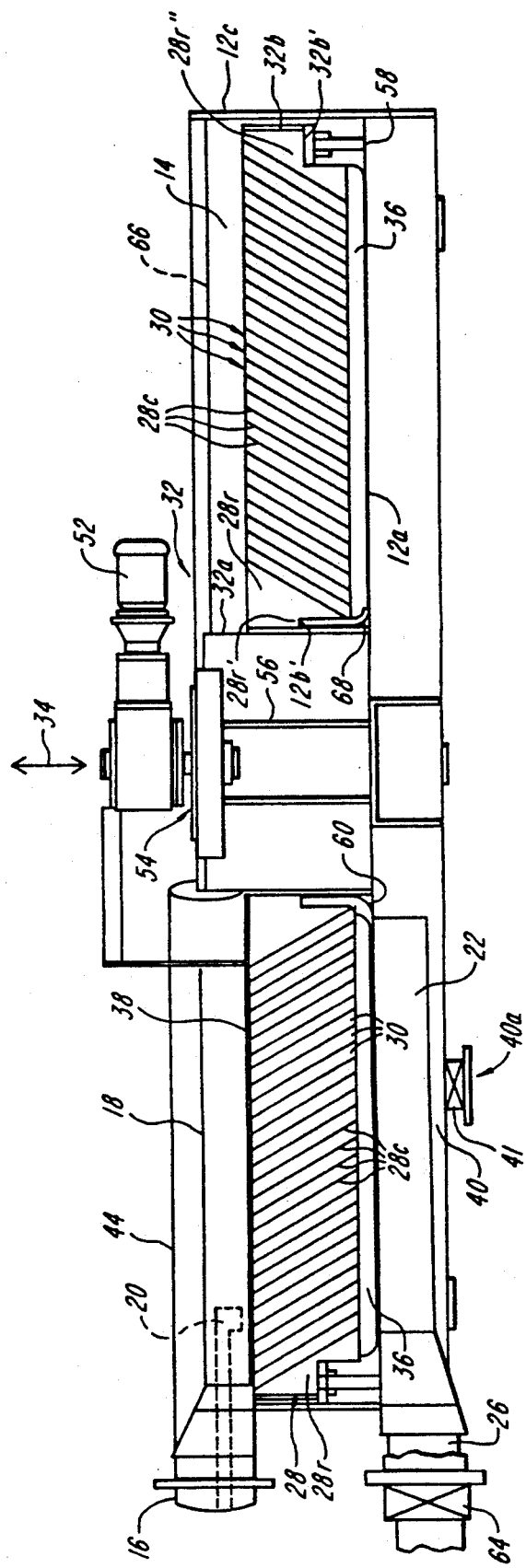
FIG. 2 is a view in vertical section taken along the line 2—2 in FIG. 1.
Figure 3:
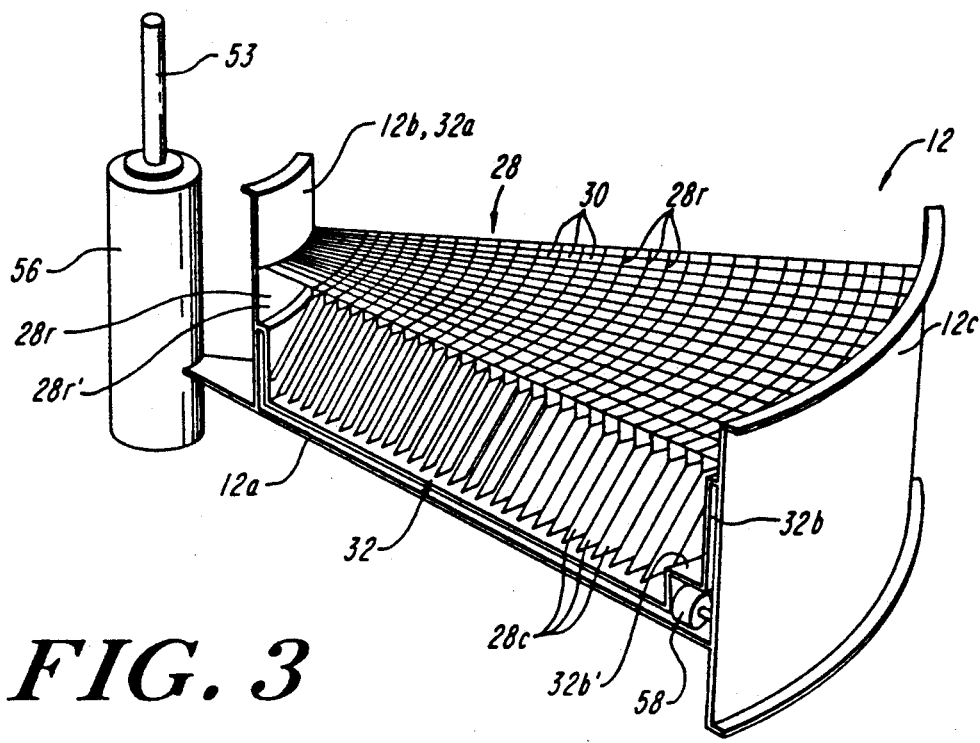
FIG. 3 is a view in perspective of one sector of the array of lamellae forming channels and its support.

FIGS. 1-3 show a water clarifier 10 according to the present invention. It has a tank 12 with a generally flat bottom wall 12a and a generally circular inner wall 12b and outer wall 12c. The tank is comparatively shallow, e.g. a total height of 18 inches, with a clearance 12d between the bottom wall and a floor or other mounting surface which is preferably also shallow, e.g. 10 inches. The outer diameter of the tank wall varies with the desired treatment capacity. Outer diameters of twelve to twenty feet are typical. The tank holds a supply 14 of water in various stages of clarification. Raw water which has been treated with an agent such as alum enters the tank via an inlet 16. A stationary distribution box 18 extending radially across one sector of the tank receives the raw water from the inlet 16. The box 18 contains at least one, and preferably two decompression valves 20 that add pressurized water with dissolved air to the raw water while releasing the air into the raw water as a stream of microscopic bubbles. The lower wall 18a of the box 18 has a set of apertures to feed the raw treated water to the tank from above. A box 22 situated below the bottom wall 12a under the box 18 is in fluid communication with the water in the tank via apertures 24 in a sector of the bottom wall 12a. The box 22 collects clarified water displaced from the bottom of the tank as raw water is added from the top. The box 22 is also stationary. It directs the collected clarified water to an outlet 26.

A principal feature of the present invention is a set of lamellae 28 that substantially fill the tank in a honeycomb array of generally vertically extending channels 30. The lamellae are of two types, radial plates 28r that extend between the inner and outer side walls 12b and 12c and curved, concentrically arrayed plates 28c. The plates 28r include trimmed lower corners 28r' and 28r' that rest on and are located by ledges 12b' and 32b' formed in the inner wall 12b and an outer wall 32b of a support assembly 32, respectively. The plates 28r are otherwise generally rectangular and oriented vertically The plates 28r and 28c are preferably formed of thin sheets of plastic, e.g. ones having a thickness of 75 mils. The plates preferably have slots laser cut half way through from an upper or lower edge. The plates 28r and 28c can then interlock with one another to form the array of channels 30 as illustrated. Although the plates are comparatively thin, this interlocking structure provides a sufficient degree of mechanical rigidity to be self supporting and mechanically stable. As shown, the lamellae are organized into eight sectors defined by steel walls 32c of the support frame 32. Each plate 28c is preferably continuous between adjacent plates 32c. While the plates 28r and 28c interlock, they can assume other forms, be assembled in other manners, be formed of other materials, and define channels 30 with different cross-sectional configurations as well as dimensions. As shown, the channels have a generally rectangular cross-section with a cross-sectional area that varies from about 2 inch$^2$ to about 8 inch$^2$ as adjacent plates 28r diverge as a function of their radial position.

Although each of the channels extends generally vertically, they are preferably inclined. Their adjacent inclined walls 28c are sufficiently closely spaced from one another that the projection of the plates 28c onto a horizontal plane orthogonal to the axis of rotation 34 overlap one another. At a preferred angle of approximately 60° from the horizontal (as shown), an inter plate spacing of 2.0 inch (measured in a horizontal plane) in a standard tank depth of 16 to 20 inches, the overlapping is at least 50% and preferably at least 75%, depending on the vertical height of the channels. The degree of overlapping is a direct measure of an increased treatment capacity produced by this inclination a compared to a comparable clarification unit using a straight vertical rise. Stated in other words, the inclination of the channels creates a longer path for the flocced particles carried to the surface of the water on rising air bubbles. This longer path, and the attendant increase in flotation efficiency, is not achieved by increasing the size of the tank, whether in diameter or depth. The inclination is in the range of 45° to 90° from the horizontal.

It is also significant that the channels are rotated through the tank by the support frame 32. Each channel therefore moves continuously through the water held in the tank in a generally horizontal direction, one transverse to the direction of the inclined flotation process defined by the interior of the channels. In the past it has been important to avoid motion of any parts in the tank, or to structure the components and their movement to minimize turbulence in the water since turbulence interferes with the flotation process. In the present invention, the lamellae forming the channels 30 occupy most of the interior volume of the tank 12. Movement of this mass in a body of water creates turbulence. Moreover, since the lamellae are arrayed around the tank completely, there is no body of open water in the tank where flotation can occur once a mechanism has traveled through that body, as is the case in the prior Supracell and SAF ('485) clarifiers noted hereinabove. It is therefore significant that the lamellae are interconnected to form channels enclosed by solid side walls—portions of the plates 28r and 28c—and that the joints where these plates meet are generally resistant to leakage flows. This construction "locks" a column of water in each channel and shields it against turbulence as it carries the column through the tank sideways. Further, because there is no relative motion of each column of water with respect to its surrounding and defining channel walls, flotation clarification in this column of water occurs with a net zero velocity with respect to the water. The bubbles carry the flocced particulates to the surface in an undisturbed path that is direct, except for the elongation of the flotation path due to the inclination of the plates 28c, 28c.

The isolation of the flotation process from turbulence is aided by sliding seals 36,38 between the channels and the bottom wall 12a and the distribution box 18, respectively. A seal 36 is secured along the lower edge of each plate 28r. The lower end of each seal rides along the bottom wall 12a as the plates 28r rotate. The seals block turbulence produced by the motion of the lamellae and the frame from influencing the flotation process via the open lower end of the channels. The seals also sweep settled particulates to a sump 40 where they drain into an outlet 40a that is cleared periodically through the action of an automatic pinch valve 41. The seals 38 at the bottom of the distribution box engage the upper ends of the channels 30. The seals 36 and 38 ensure that a direct exchange of raw and clarified water held in the channels 30 as they pass under the distribution box and over the aligned collection box 22, both of which have an array of openings in their walls facing the tank 12 to allow a direct fluid transfer to and from the channels. To this end, the raw water feed rate is coordinated with the volume of the channels being fed at any one time and the rate of rotation of those channels to ensure that the raw water entering each channel 30 displaces an equal volume of clarified water to the box 22. This equal volume is also preferably equal to no more than the maximum volume of water that can be held in the channels to avoid a direct feed through of raw water to the clarified water collection box 22.

The water level in the tank is preferably a few inches above the upper edge of the lamellae forming the channels 30. Floated sludge from all of the channels collects on the surface of this continuous upper layer of water. A slow rotation of the floated sludge mass occurs through a hydraulic coupling to the rotating lamellae. The momentum of this mass carries the sludge into a sludge collector 42 that has a generally cylindrical housing 44, a longitudinal opening 44a at the water level, a skimmer 46 and a screw conveyor 48 mounted within the housing 44 for rotation about its own central axis defined by a shaft 48a.

Figure 5:
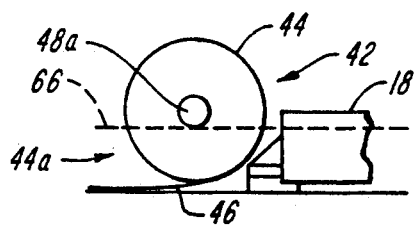
FIG. 5 is a view in vertical section of the sludge conveyor taken along the line 5—5 in FIG. 1.
Figure 6:
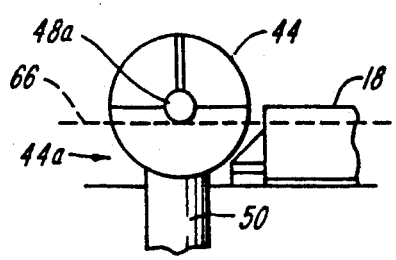
FIG. 6 is a view in vertical section taken along the line 6—6 in FIG. 1.
Figure 4A:
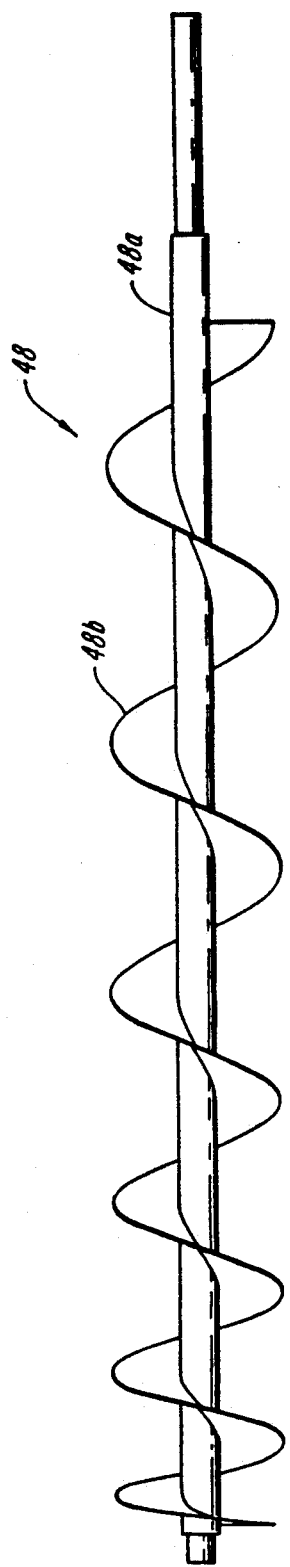
FIG. 4A is a view in side elevation of the screw alone.
Figure 4B:
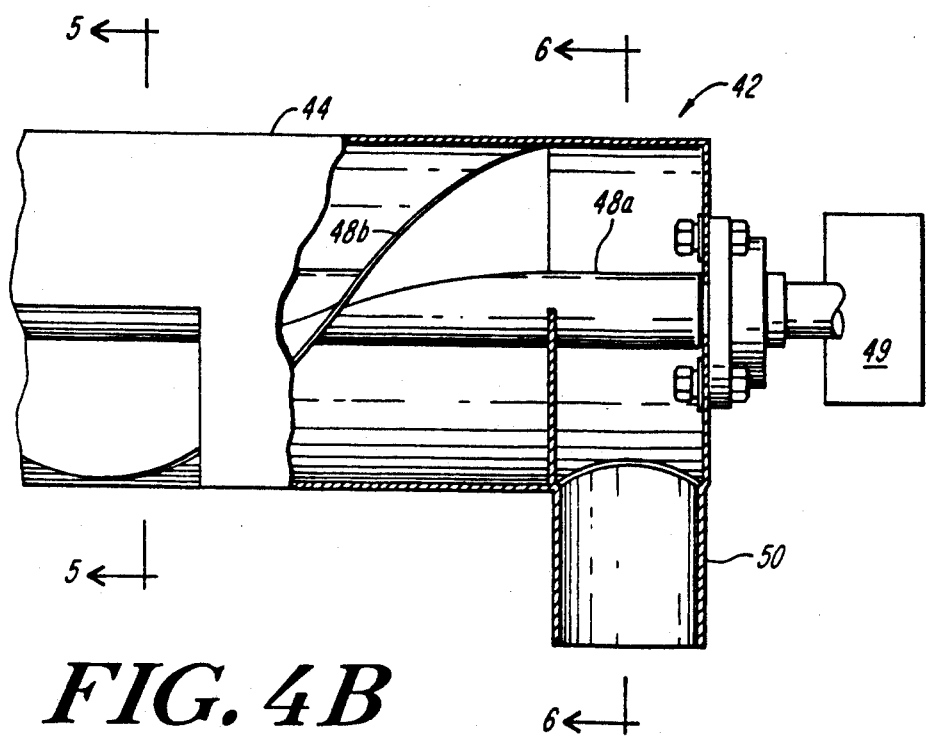
FIG. 4 is a view in the side elevation with portions broken away of the screw conveyor shown in FIGS. 1 and 2.

With particular reference to FIGS. 4–6, the skimmer 46 is a ramp-like extension or lip extending from the lower end of the housing 44 at the opening 44a. The lip is positioned to knife under the floated sludge and direct it into the interior of the housing 44. The upper edge of the opening 44a is a straight edge cut to lie above the water level and above the top edge of the floated sludge. A motor 49 rotates the screw conveyor at a variable rate of rotation in a direction which causes the screw threads to drive the skimmed sludge axially along the conduit towards a collection conduit 50. The flights 48b of the screw are of a constant diameter, but a variable pitch. The diameter fills the housing 44 to propel all of the collected sludge. The variable pitch, preferably a variation of about 4:1 over the length of the shaft 48a, provides a uniform propulsion despite the heavier accumulating load on the screw at the outer end adjacent the outlet 50. The shaft 48a is preferably a continuous rod of stainless; the flights may be formed as continuous assembly or sectionally. In either case they are welded to the shafts and should be as smooth as possible.

A gear motor 52 propels the support frame 32 via a drive spindle 53 and a central bearing assembly 54 supported on a tubular central support 56. The frame includes inner and outer circular walls 12a and 32b connected by spider-like walls 32c that define eight sectors of the channels. Wheels 58 secured to a circular flange 38d extending inwardly of the outer wall 38b roll over the bottom wall 12a while supporting the weight of the frame 32 and the lamellae carried on the frame at their outer edges. The inner wall 12a rotates under control of the gear motor 52. A circular seal 60 establishes a sliding seal between the rotating inner wall 12a and the stationary bottom tank wall 12a. The outer carriage wall 32b also rotates through the tank, but the outer tank wall 12c, closely spaced from the outer frame wall 32b, is stationary. A stationary support beam 62 extends across the top of the tank 12 along a chord and is supported at the outer wall 12c of the tank. The beam 62 provides mechanical support for the boxes 18 and 22 and the skimmer assembly 46.

In operation, a valve 64 in the clarified water outlet line 26 controls the outflow of clarified water from the bottom of the tank 12 via the box 22 in response to a conventional water level sensor, or preferably an infrared level detector of the type described in U.S. Pat. No. 4,931,175. The valve 64 keeps the water level 66 in the tank 12 constant. As the carriage 32 rotates the lamellae between the raw water distribution box 18 and the clarified water collection box 22, clarified water is drawn out from the bottom of the lamellar channels and the same amount of raw, treated water flows into the channels. As noted above, the rate of rotation of the frame 32 is coordinated with the volume of the channels, the size of this inlet/outlet sector (about 1/16 of the total tank, as shown), and the flow rates into and out of the boxes 18 and 22 that this exchange of water occurs automatically as the lamellae rotate between the boxes. Once filled with raw water mixed with coagulating/flocculating chemicals and air bubbles, the lamellae lock columns of water in the channels 30 as they rotate around the tank. One complete rotation occurs approximately every one to two minutes. During this time period, flotation separates suspended solid contaminants from the water. They rise on the air bubbles along the inclined paths to form a layer of sludge floating on the surface of the water held in the tank. The water level is above the upper edges of the lamellae. The skimmer 46 scrapes the sludge off the top of the lamellae at the end of the rotation, just before the inlet box 18. At this point the channels contain only clarified water. During this rotation, the bottom seals 36 sweep sedimented impurities into the sump 40 also located just before the inlet box 18.

This lamellar clarifier and this method of operation produces a clarification rate of approximately 260 liters/m$^2$/min, about twice that of the '696 Supracell clarifier which also operates on a net zero velocity principle, but with no lamellae in the tank 12. As a result, a clarifier of a given diameter can handle an increased throughput, or the same treatment capacity can be provided with a substantially smaller unit. The lamellae can be precut by laser which yields a favorable cost of manufacture. The lamellar clarifier may make cleaning more difficult in applications where cleaning is important. However, for many applications the increased flotation rate and/or smaller size outweigh cleaning considerations.

Viewed as a process, the invention includes locking treated raw water into an array of closed-sided, generally vertically extending channels in a tank and then moving the channels laterally within the tank while clarification occurs in the channels. The process includes inclining the channels, adding the treated water at a stationary point and withdrawing clarified water also at a stationary point. The process includes removing floated sludge after the clarification is complete. The moving occurs without any significant turbulence within the channels and with the rising bubbles separating out the flocced particulates experiencing a net zero velocity with respect to the associated body of water locked in the channel.

There has been described a clarifier and a method of operation that remove suspended particulate contaminants from raw water at a flotation rate that is approximately double that attainable with the closest comparable single stage clarifier (one not also using a sandbed or the like for second stage clarification). The increased performance allows a more compact unit for a given treatment rate, or a increased treatment rate for the same size tank. These advantages are provided at a competitive cost of manufacture.

While the invention has been described with reference to its preferred embodiments, it will be understood that various modifications and alterations will occur to those skilled in the art from the foregoing detailed description and the accompanying drawings. For example, while the circular tank embodiment has been described with respect to concentrically curved plates 28c, they can be formed flat or in flat segments. Also, they can be joined to the radial plates in a variety of ways, or even molded as a single unit, or in sections. Different stationary inlet, outlet and skimming mechanisms can be used. Different seals can be used. The invention can also be used in combination with a second stage sand filter at the bottom of the bed where the lamella also serve to hold filter material in the tank during backwashing. These and other modifications and variations are intended to fall within the scope of the appended claims.

What is claimed is:

1. Apparatus for the classification of raw water treated with a flocculating agent and dissolved air that is released as microscopic bubbles that float flocced particulate contaminants to the surface of the water where they form a sludge comprising,
   a generally circular tank that holds a supply of the water during the floatation,
   a plurality of channels each of which extend generally vertically within the tank, said plurality of channels substantially filling said tank, and
   inlet means for introducing said raw, treated water into said channels,
   outlet means for withdrawing clarified water from said channels after a preselected time after said introducing,
   means for removing sludge from the surface of the water in said tank,
   means or moving said plurality of channels within said tank in a generally horizontal direction whereby the flotation of flocced particulate contaminants occurs in said channels,
   said plurality of channels being constructed to hold the water with substantially no turbulence in the held water and at an effective net zero velocity of the held water with respect to said channels despite said moving.

2. The apparatus according to claim 1 wherein said channels are inclined from the vertical to provide an enhanced flotation path length and an increased clarification capacity for a given tank size.

3. The apparatus according to claim 2 wherein said plurality of channels is formed by an intersecting array of radially and concentrically directed plates, said radial plates being oriented generally vertically and said concentric plates being inclined in the range of 45° to 90° from the horizontal.

4. The apparatus according to claim 3 wherein said tank has a general flat bottom wall and wherein at least a portion of said radial plates carry means for establishing a sliding seal between each of said portion of plates and said bottom wall.

5. The apparatus according to claim 4 wherein said moving means comprises a frame that supports said array of plates and a motor that drives said frame and said plates to rotate within said tank with said plurality of channels open at their top and bottom ends to the water in said tank.

6. The apparatus according to claim 5 wherein said frame includes a central support, a generally cylindrical inner wall rotatable about the support in said tank, a set of wheel mounted at the periphery of said frame that roll on said bottom wall, and means for establishing a seal between said inner wall and said bottom wall.

7. The apparatus according to claim 1 wherein said inlet means and said outlet means each include a stationary box in fluid communication with water held in said tank, said boxes extending generally radially over a sector of said tank and aligned with one another so that the inletting of raw treated water at the top of said holding means displaces clarified water from said holding means into said outlet box in coordination with the movement of said holding means through said sector.

8. The apparatus according to claim 1 wherein said sludge removing means comprises a stationary conduit extending radially across said tank, means for skimming said floated sludge from the water held in said tank to the interior of said conduit, and means for advancing said sludge radially along said conduit.

9. The apparatus according to claim 8 wherein said axial advancing means includes a variable pitch screw mounted for rotation within said conduit, and means for rotating said screw about its longitudinal axis.

10. A water clarification process carried out in a generally circular tank with inlet means for raw, treated water, outlet means for clarified water and means for removing sludge that collects on the surface of the water held in the tank and being clarified by flotation, comprising, holding the water in the tank in a plurality of generally vertically extending channels, and rotationally transporting the plurality of channels through the tank with a net zero relative velocity of said held water with respect to said channels and substantially no turbulence for a period of time sufficient to effect clarification of the water held in said channels, and holding the inlet means, outlet means and sludge removal means stationary.

11. The process of claim 10 wherein said channels are inclined.

12. The process of claim 10 wherein said holding comprises introducing said raw, treated water into an open ended array of said channels.

13. The process of claim 12 wherein said introducing displaces clarified water from said channels to said outlet means.

14. The process of claim 12 wherein said holding comprises provided an array of intersecting radial and concentric plates.

15. The process of claim 12 further comprising the step of substantially isolating sectors of said channels from one another along radial lines.

* * * * *